Patented Apr. 21, 1936

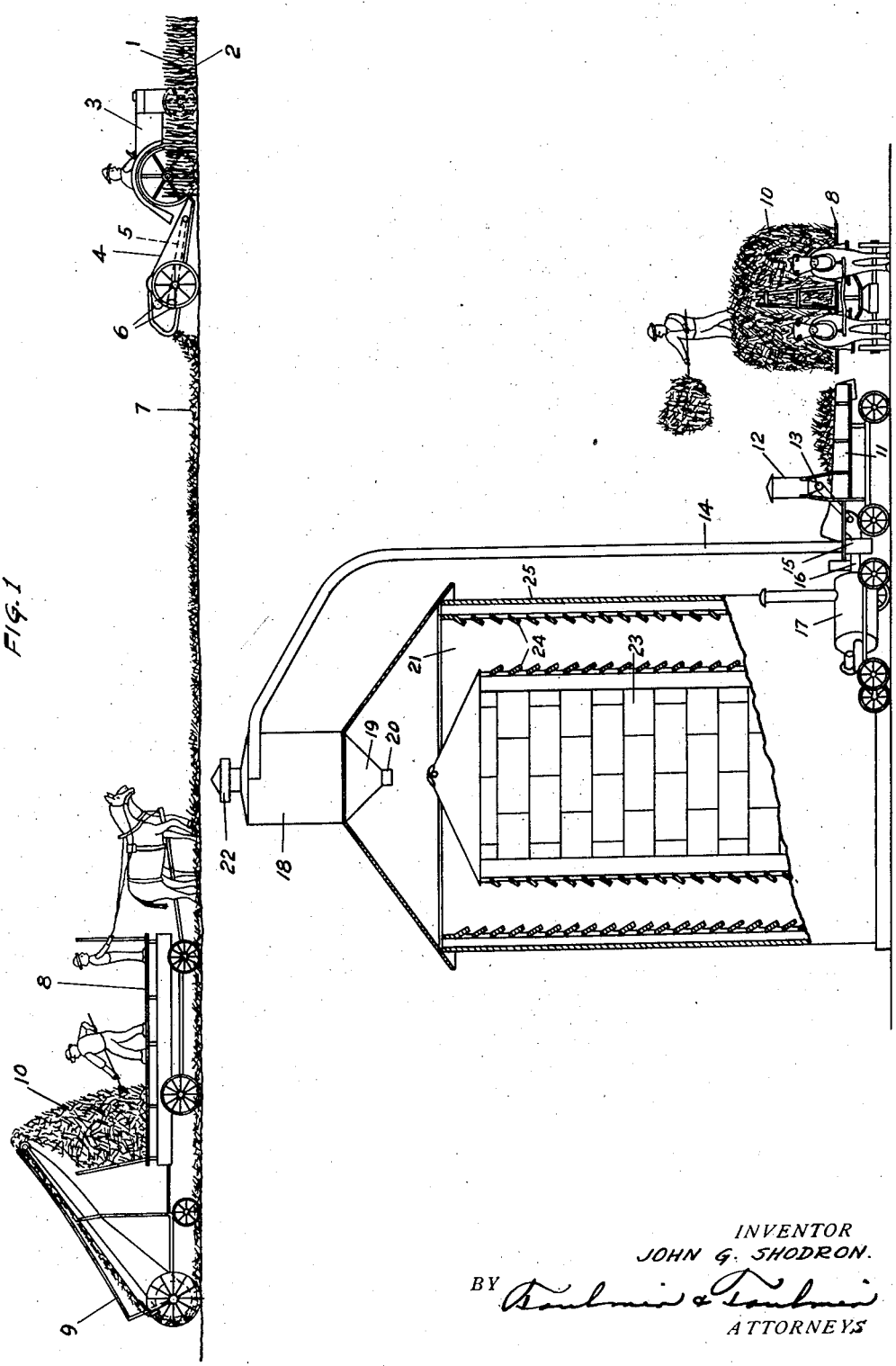
April 21, 1936.     J. G. SHODRON     2,038,008
METHOD FOR DEHYDRATION, STORAGE AND MAINTENANCE
OF DEHYDRATION OF FOOD PRODUCTS, SUCH AS HAY
Filed Jan. 7, 1933     5 Sheets-Sheet 1
INVENTOR
JOHN G. SHODRON.
BY
ATTORNEYS

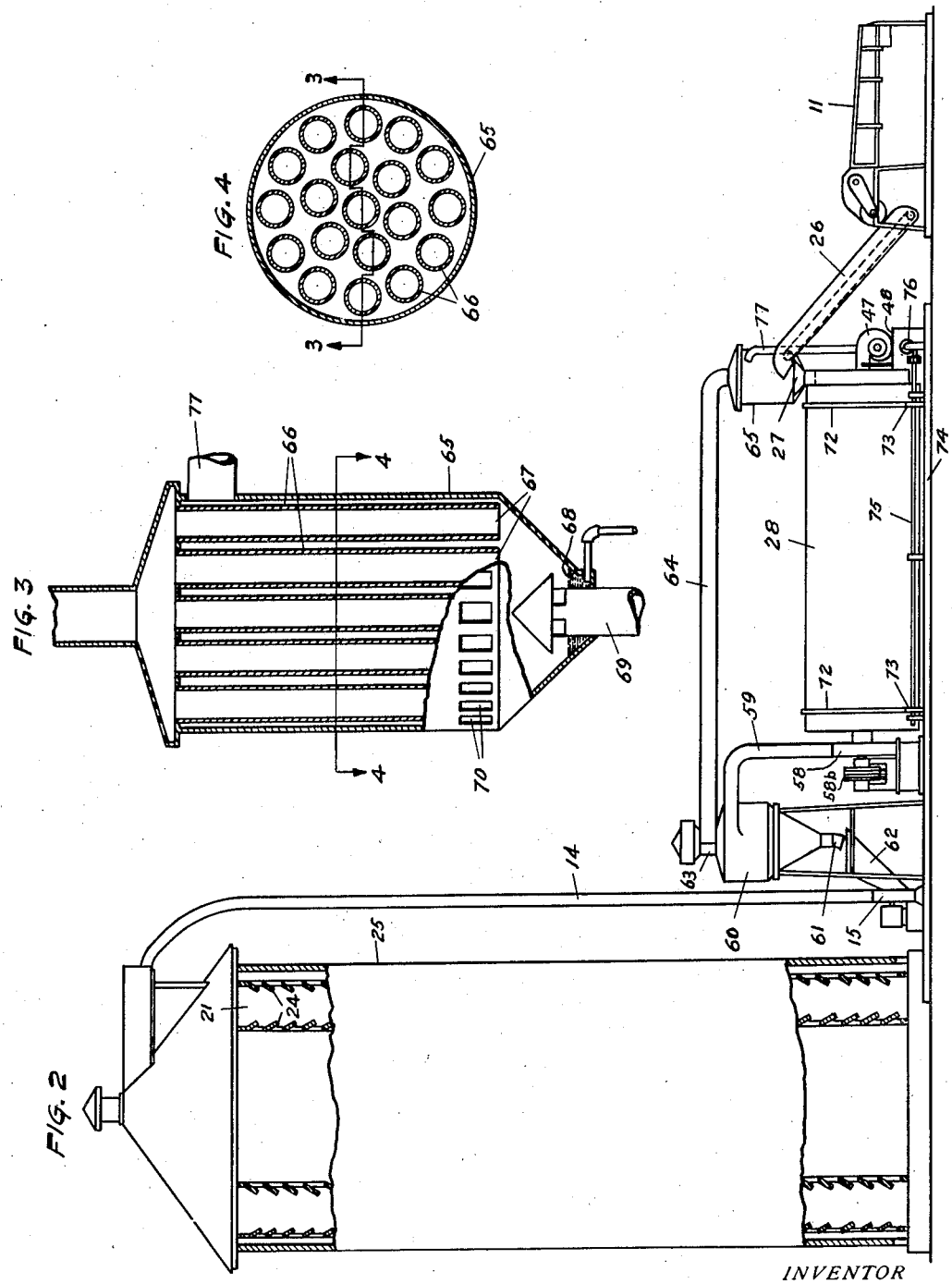

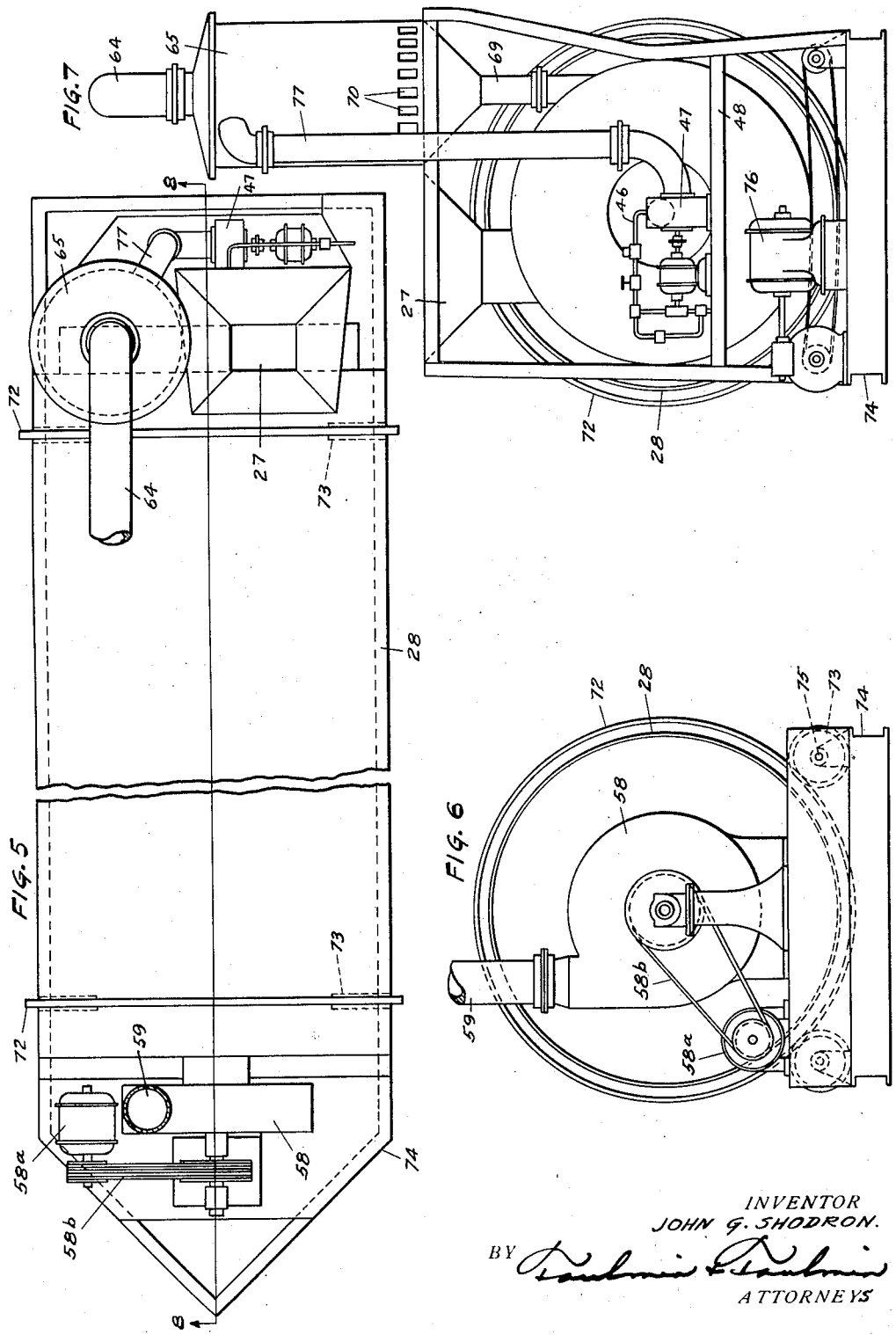

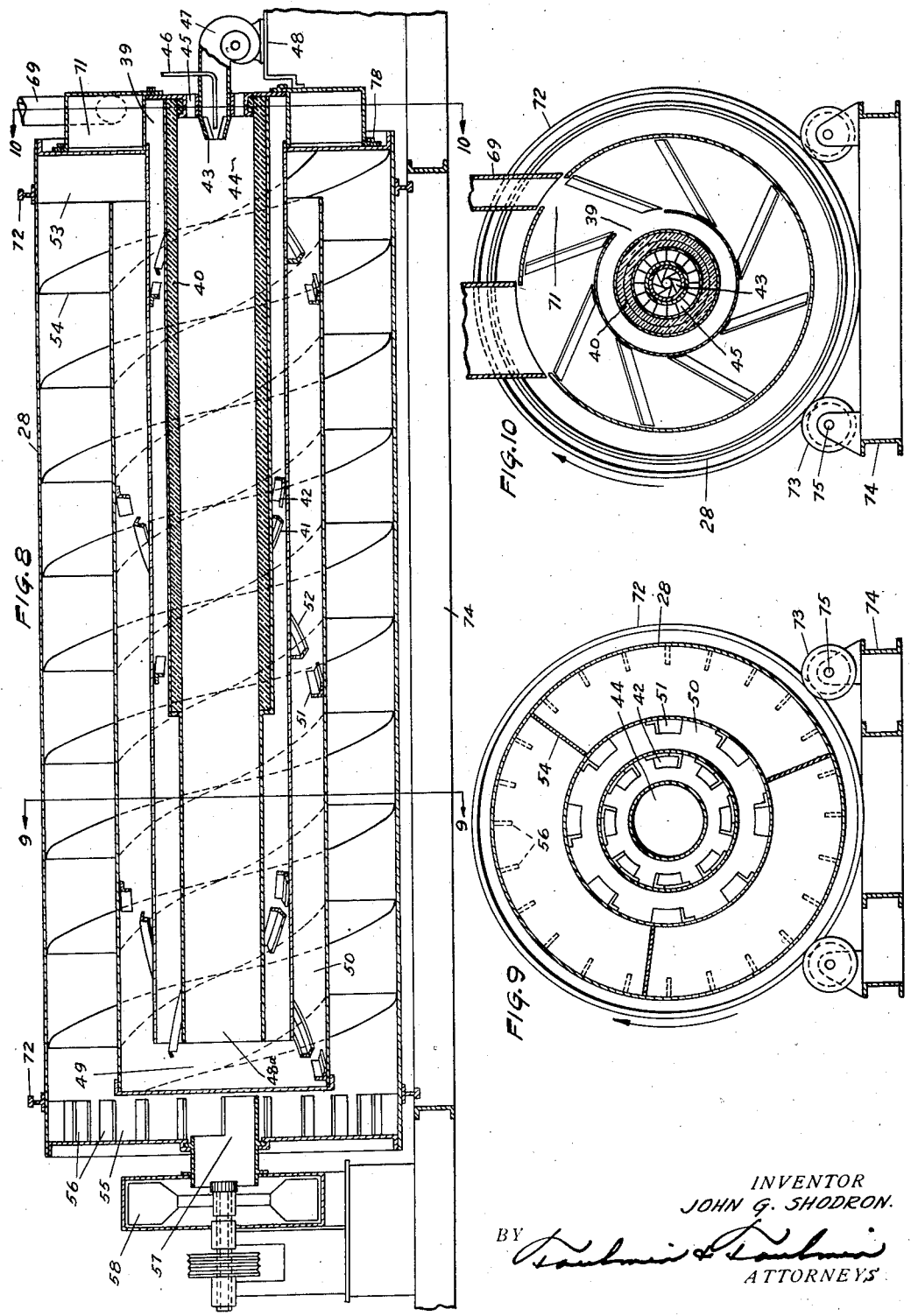

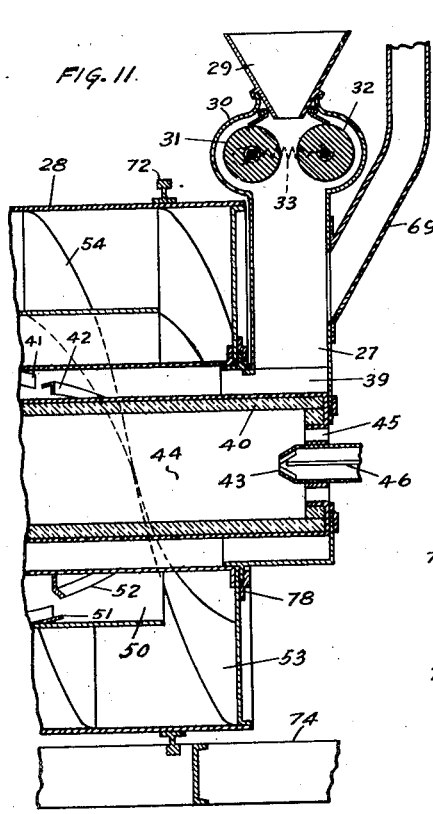
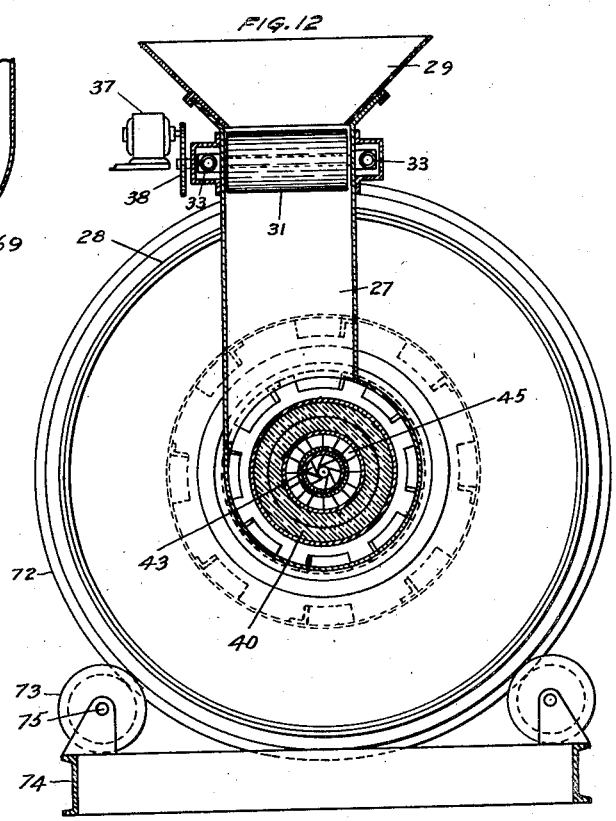
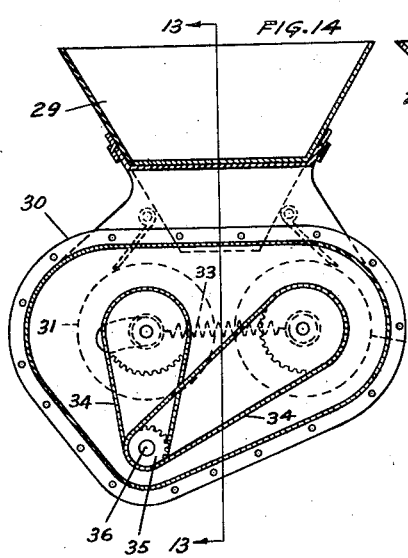
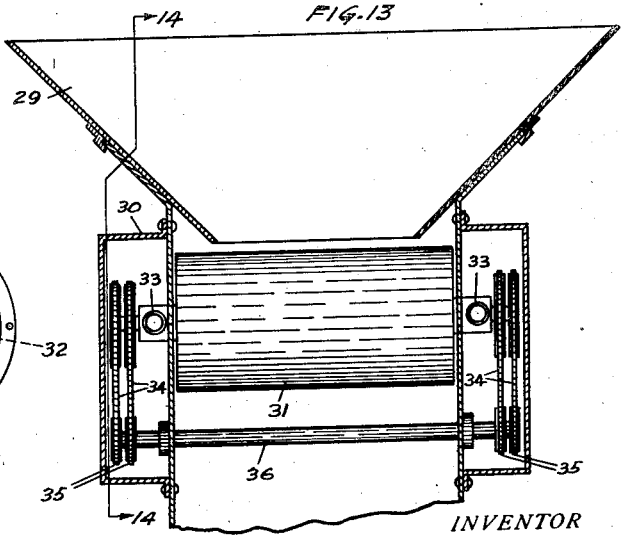

2,038,008

UNITED STATES PATENT OFFICE 2,038,008

METHOD FOR DEHYDRATION, STORAGE, AND MAINTENANCE OF DEHYDRATION OF FOOD PRODUCTS, SUCH AS HAY

John G. Shodron, Fort Atkinson, Wis., assignor to James Manufacturing Company, Fort Atkinson, Wis., a corporation of Wisconsin Application January 7, 1933, Serial No. 650,732

2 Claims. (Cl. 99—8)

My invention relates to the method and apparatus for the harvesting, curing and storing of hay.

It is the object of my invention to provide a method by which hay may be cut in the field, naturally cured by the air and sun in the field, then loaded after having been cut in the usual lengths and so naturally cured; thereupon it is conveyed to a point where it is chopped into short lengths, further cured by artificial drying, optionally salted before or after being artificially dried and then delivered to a point where it can be cleaned so that foreign material and entrained moisture are removed, after which it is distributed and stored in a body that is capable of continuous ventilation throughout in order to continue its prime cured condition.

It is my object by this storing to prevent spontaneous combustion due to the continuous ventilation of the hay, while at the same time being able to store hay that has had either no air and sun curing in the field or a relatively small period during the course of a part of a day. By this method the hay is stored in greenish condition without shattering and without the loss of the leaves of the hay due to shattering, with a large increase in vitamines and proteins. By this method I also avoid losses due to inclement weather and I am enabled to regulate and control the curing exactly according to the condition of the hay.

For instance, if it has been a dry season, the amount of curing can be exactly adjusted, which has heretofore been impossible as compared with the curing applied if the hay has been grown during the wet season. It is also possible to cut the hay before it is advanced to its maturity, as curing has heretofore been necessary before cutting it with the result that there are no losses due to the shattering of the hay during harvesting.

Heretofore it has been necessary to allow hay to mature and to ripen to its fullest extent possible while standing due to the fact that green hay, if cut and cured in the field, would later take fire in the barn.

By my method I not only control the application of heat while using as much natural sunlight and air as possible, but I also crush the hay, allowing it to dry in the field after being crushed so as to facilitate the escape of moisture from the hay, which can then be cut before it is fully dry and ripe while standing. This crushing also facilitates the artificial drying of the hay and reduces the expenditure for that purpose as the chopped, crushed stems readily give up their moisture under the influence of heat.

It is my object to provide a method by which field dried hay which has been cut and crushed may be immediately placed in a ventilated storage chamber, preferably after further chopping if the hay has less than 30 percent water content, but in the event it has more than 30 percent water content, adequate artificial drying must be applied.

It is my object to provide means to crush the heavy stems of the plants so that they will dry at a rate comparable with that of the leaves.

It is my object to provide thereafter the application of hot gases to explode the plant cells and remove a portion of the water there-contained, after which the hay is separated from the dust, water vapor and combustion gases and then it is stored in a continuously ventilated storage chamber.

It is a further object to provide a dehydrator and blower which moves the hay, preferably in chopped condition, from the crusher in a tortuous path in the presence of hot air which conveys it, after which the hay is conveyed with the hot air to a cyclone separator, at which point there is extracted the dust, entrained moisture and surplus of hot air, and then the clean dry hay is deposited by gravity and distributed in a continuously ventilated storage chamber.

Referring to the drawings, Figure 1 illustrates the steps of cutting and crushing in the field and sun and air curing in the field, loading, conveying, unloading, chopping, salting, drying, cleaning and storing under ventilated conditions.

Figure 2 is a side elevation with the storage chamber partially in section of the more elaborate drying mechanism comprising a dehydrator.

Figure 3 is a section on the line 3—3 of Figure 4 through the economizer.

Figure 4 is a section on the line 4—4 of Figure 3.

Figure 5 is a top plan view of the dehydrator.

Figure 6 is an end elevation from the blower end.

Figure 7 is an end elevation from the feeding end.

Figure 8 is a vertical section through the dehydrator on the line 8—8 of Figure 5.

Figure 9 is a section on the line 9—9 of Figure 8.

Figure 10 is a section on the line 10—10 of Figure 8.

Figure 11 is a detailed section of the application of the crusher rollers to one end of the dehydrator.

Figure 12 is an end elevation thereof.

Figure 13 is a detailed section on the line 13—13 of Figure 14.

Figure 14 is a detail section on line 14—14 of Fig. 13.

Referring to the drawings in detail, 1 indicates the standing hay which has been planted in the field 2. The tractor 3 draws the combined harvester and crusher 4. The hay is conveyed after being cut upwardly on the belt 5 between the crushing rollers 6 and deposited in a wind row 7. If desired, the hay may be left in the field throughout a portion of the day if the sunlight and air are such that they can be used for natural curing and the evaporation of moisture in the hay. This time is usually about five hours. At the end of the five hour period a collecting wagon 8 which has a trailing loader 9 picks up the hay at 7 and deposits it in a mass 10 in its cut and crushed condition. Having been cut in the field and crushed prior to natural curing, the moisture can be withdrawn from the hay more rapidly than if the hay had not been crushed. The hay at this stage is still in long lengths.

It may be desired to harvest the hay, crush it, chop it and directly deliver it into a collecting wagon if weather conditions indicate that this is desirable, but according to the preferred method in this invention, I follow the first mentioned steps.

The crushed, naturally dried hay in long lengths is brought in on the wagon 8 where it is forked into a chopper 11 where it is chopped into short lengths of two or three inches, or any length desired, so that the hay is more edible for stock, at the same time the exposed ends of the crushed stems permit the exit of moisture more rapidly. If desired, salt may be sprinkled from the salt hopper 12 operated by the rotary distributor 13. The salt thus drops upon the chopped hay before it is introduced into the blow pipe 14 by the blower 15 which is supplied with heated air through the pipe 16 from the drying furnace 17. This heated air dries the hay as it is blown through the blow pipe 14, removing the additional moisture artifically from the hay. There upon the hay is delivered into the cyclone separator 18 where the hay is thrown out centrifugally and deposited through the hopper 19 and spout 20 into the space 21, while at the same time the moisture, water vapor, dust and other materials which would contaminate the hay are removed by the cyclone separator through the ventilator 22. The hay falling in this space 21 around the silo 23 falls between two foraminous walls 24 in a narrow column where it is continuously ventilated by air passing up between the silo wall 23 and one foraminous wall 24 and the container wall 25 and the other foraminous wall 24.

This air which rises through the hay mass continuously ventilates it so as to retain its temperature at the proper point to prevent spontaneous combustion, at the same time to continue the process of removing the moisture and maintaining the hay in wet cured condition.

By this method the hay is prevented from shattering, as it can be cut in the field and while still in strong semi-green condition before the drying and shattering condition takes place, properly treated, cured and stored, and it is safe to do this because it is not only thoroughly cured before storing but continuously ventilated after storing. This results in an increase in the food value of the hay due to the collection of all of the succulent leaves and the retention of proteins and vitamines in the hay of approximately 25 percent. Losses from weather changes are practically completely eliminated. The hay becomes a manufactured product, the content of which is accurately controlled and regulated according to the moisture content. It is not necessary any longer to wait until the hay becomes excessively ripe in the field before cutting it in order to prevent injury to the hay after cutting from the weather, because it now can be cut according to my method before it is so excessively ripe, because the excess moisture is not only not a disadvantage but a positive advantage in that hay in that semi-ripe condition will hold its leaves better during the operations of cutting and other subsequent steps of handling the hay, thus eliminating losses due to shattering, which are some of the most serious losses to which a farming operation of this character is subjected.

Under the method just described, the amount of moisture still remaining in the hay after it has been naturally dried in the field can be eliminated to the degree desired by subjecting it to a strong blast of heated air from the heater 17 which is delivered into the blower of the chopper. The extent of this treatment depends upon the time of cutting, period of drying and the weather. The crushing of the heavy stems of the plant insures that the entire plant will dry evenly and thus make up for the difference in character between the heavy stems and light leaves.

If the weather is such that the hay must be brought immediately in from the field without natural curing, it can be immediately treated in the mechanism hereinafter described and immediately stored with entire safety, both from spoilage and spontaneous combustion.

For this purpose I provide the hay chopper 11 from which the chopped hay is delivered by the conveyor 26 either into the hopper 27 which leads directly to the dehydrator 28 or into the hopper 29 of the crusher 30 which in turn discharges into the entrance hopper 27 of the dehydrator 28.

Assuming that the chopped hay is delivered through the crusher 30, it will be noted that this crusher is provided with a pair of rollers 31 and 32 drawn together by heavy springs 33 so that the chopped hay passes between the rollers and is crushed or squeezed, whence it drops into the chute 27 on its way through the dehydrator 28. These rollers 31 and 32 are driven by chains 34, and sprockets 35 on a common shaft 36. The shaft 36 passes across the machine so that both sides of the rollers are driven simultaneously by the same power source. The shaft 36 is driven by a motor 37 through the chain 38.

The chopped hay passes into the passageway 39 around the carborundum flue lining 40. It is guided in a helical path by the guide vanes 41 and 42 which constitute the first passage flights. Within this carborundum flue lining is located a plain nozzle 43 discharging into the passageway 44. Air inlet ports 45 surround this nozzle which is fed with oil through an oil pipe 46. A blower 47 on the platform 48 provides the air blast to atomize the oil supplied by the pipe 46 and discharge it through the nozzle 43. Thus the chamber 44 constitutes a combustion chamber which discharges hot gases through the end 48a of this combustion chamber into the space 49. It is into this space that the hay from the first passage flight discharges. It then turns 360 degrees and passes through the passageway 50 having guide vanes 51 and 52 constituting the second passage flight and is discharged into the third passage flight at 53, whence it is guided by the helical passageway 54 through the helical passageway thus formed until it enters the chamber 55 having the blades 56 where it is discharged centrally through the outlet passageway 57 into the fan 58. From this fan it is discharged through the blow pipe 59 into a dust collector 60 where the dehydrated, crushed, chopped hay is deposited by gravity through the spout 61 into the hopper 62, whence the fan 15 blows the hay through the blow pipe 14 into the hay containing space 21.

The hot gases that are extracted from the dust collector 60 are taken out at the central ventilation opening 63 and led by the pipe 64 back to an economizer 65. This economizer has a plurality of depending tubes 66 which extend downwardly with open ends as at 67 to deposit any moisture as at 68. A return air pipe 69 conveys the air, together with fresh air entering through the slots 70, into the space designated 71, whence it is delivered into the interior of the dehydrator.

It will be understood that this dehydrator 28 is provided with annular rails 72 at either end, which rails run upon rollers 73 mounted on the foundation platform 74 so that the whole structure is continuously rotated.

About 50 percent of the air is returned through the pipe 64, about 25 percent fresh air is mixed with the return air, and about 25 percent fresh air is injected around the oil burner.

The dehydrator 28 is rotated by the actuation of the rollers 73 which are in turn moved by the shafts 75 on which they are mounted that are driven by a motor 76. The blower 58 is driven by the motor 58a through the belt 58b.

The blower 47 is supplied with hot return air through the pipe 77 which is connected to the economizer 65. Thus the burner is provided with hot atomized air for discharge into the rotating combustion chamber with corresponding economy in fuel consumption.

If desired, the sealing joints between the rotating and stationary portions of the dehydrator may be provided as indicated at 78. This prevents outside air from leaking in and chopped hay from leaking out through these double sealed joints.

This particular dehydrator has advantages not heretofore known in the art such as the following:

(1) It requires no separate oven or combustion chamber while at the same time the successive concentric passages effectively insulate the inner combustion chamber.

(2) The spiral outer passages provide maximum length of drying space in a very compact drum, thereby eliminating excessive material costs in construction and reducing power operating costs.

(3) The flights and spirals in the dehydrator insure the positive movement of heavy particles and minimize the chance of scorching of the hay.

The radiant heat in the combustion chamber is absorbed by the brick lining from the high temperature flame and is thus made available to heat the incoming fresh air stream coming through the inlets. The heated air and gases heat the plant cells to a degree where their water content turns to steam and explodes the wall structures and lays open the fibrous material for rapid drying.

It will be thus noted that I have the combination of a combustion chamber, a hay preheating and wilting chamber in the passage constituting the first flight, a plant cell exploding chamber in the second flight and a combustion chamber in the third or helical passage flight as at 54.

It will be understood that I desire to comprehend within my invention such modifications as may be necessary to adapt it to varying conditions and uses.

Having thus fully described my invention, what I claim as new and desire to secure by Letters Patent is:

1. In a method of curing and storing hay, cutting the hay in the field, crushing the hay stalks, leaving the crushed hay in the field to partially cure, heating the hay, extracting the dust and foreign material from the hay by a draft of air to further partially cure the hay, storing the hay in a comparatively thin vertically arranged mass in a container having foraminous walls, and permitting air to pass through the walls and through all portions of the hay to further cure the hay.

2. In a method of curing and storing hay, cutting the hay in the field, crushing the hay stalks, leaving the crushed hay in the field to partially cure, chopping the hay, heating the hay, extracting the dust and foreign material from the hay by a draft of air to further partially cure the hay storing the hay in a comparatively thin vertically arranged mass in a container having foraminous walls, and permitting air to pass through the walls and through all portions of the hay to further cure the hay.

JOHN G. SHODRON.